(12) United States Patent
Minor et al.

(10) Patent No.: US 8,453,325 B2
(45) Date of Patent: Jun. 4, 2013

(54) METHOD OF REPAIR ON NICKEL BASED HPT SHROUDS

(75) Inventors: Michael Minor, Arlington, TX (US); Scott Hlavaty, Euless, TX (US)

(73) Assignee: United Technologies Corporation, Hartford, CT (US)

( * ) Notice: Subject to any disclaimer, the term of this patent is extended or adjusted under 35 U.S.C. 154(b) by 803 days.

(21) Appl. No.: 12/621,078

(22) Filed: Nov. 18, 2009

(65) Prior Publication Data

US 2011/0117385 A1    May 19, 2011

(51) Int. Cl.
*B23P 6/00* (2006.01)
(52) U.S. Cl.
USPC ........................................... 29/889.1
(58) Field of Classification Search
USPC ........................................... 29/889.1
See application file for complete search history.

(56) References Cited

U.S. PATENT DOCUMENTS

| | | | |
|---|---|---|---|
| 6,235,370 B1 | 5/2001 | Merill et al. | |
| 6,464,128 B1 | 10/2002 | Messelling et al. | |
| 6,877,651 B2 | 4/2005 | Sandin | |
| 6,968,991 B2 | 11/2005 | Renteria et al. | |
| 7,303,112 B2 | 12/2007 | Ivory et al. | |
| 7,360,991 B2 | 4/2008 | Ford et al. | |
| 7,363,707 B2 | 4/2008 | Powers | |
| 2004/0202885 A1 | 10/2004 | Seth et al. | |
| 2006/0163324 A1 | 7/2006 | Hunt et al. | |
| 2007/0017958 A1 | 1/2007 | Hasz et al. | |
| 2009/0175727 A1* | 7/2009 | Bischof et al. | 416/179 |

* cited by examiner

*Primary Examiner* — David Bryant
*Assistant Examiner* — Moshe Wilensky
(74) *Attorney, Agent, or Firm* — Kinney & Lange, P.A.

(57) ABSTRACT

A method of repairing an abradable, nickel single crystal material having an abraded surface area by applying a diffusion layer to the abraded surface area comprising a nickel-based alloy having a quantity of an additional element selected from silicon and boron; and also applying an abradable layer to the material comprising a cobalt-based alloy to restore the abraded surface area.

5 Claims, 1 Drawing Sheet

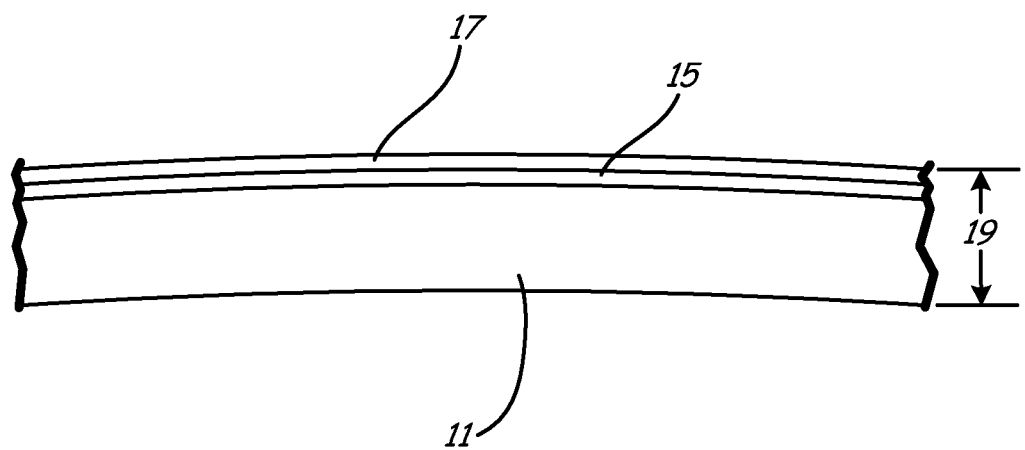

METHOD OF REPAIR ON NICKEL BASED HPT SHROUDS

BACKGROUND

Gas turbine engines draw air into the engine using a compressor. Fuel is mixed with the air and combustion takes place. The hot exhaust gasses pass through a turbine to drive the compressor and are exhausted out the back of the engine to drive the airplane. The turbine includes a large number of turbine blades that rotate when the hot gas impacts them. A shroud surrounds the blades to direct the hot gasses on to the blades and prevent leakage of the gas.

The clearance between the blades and the shroud is kept to a minimum during ordinary or steady state operation of the turbine. During take-off and reverse thrust, the blades will contact the shroud. The shroud is made of an abradable material in order to minimize damage to the turbine blades. At periodic intervals, the shroud is repaired by coating with an alloy on its inner surface to re-establish the proper clearance for the shroud and turbine blades.

In recent years, the shroud has been made from nickel-based superalloys rather than cobalt-based superalloys because they operate at higher temperatures due to the microstructure of the alloy. In the past, cobalt-based superalloys have been found to be incompatible with nickel-based shrouds, and thus nickel-based superalloy coatings have been used with the nickel-based superalloy shrouds.

SUMMARY

The present invention relates to an improved method and coating for repairing gas turbine shrouds and other components that are abradable and in the path of hot gasses such as encountered in gas turbine engines. The invention is particularly suited for use with nickel single crystal shrouds and other components. A first layer or coating is applied comprising a nickel alloy and/or a nickel-based silicon or boron depressed braze alloy that functions as a diffusion barrier, where the primary melting point depressant of the braze alloy is either silicon or boron. A second abradable coating or layer is also applied comprising a cobalt-based abradable alloy. The first coating functions to create a diffusion barrier that prevents the abradable cobalt alloy from penetrating into the nickel single crystal substrate, keeping the abradable cobalt alloy on the surface to function as an abradable seal.

BRIEF DESCRIPTION OF THE DRAWINGS

FIG. 1 is a side elevational, schematic view of an embodiment of the present invention.

DETAILED DESCRIPTION

The application of a multilayer material to turbine nickel single crystal parts and other components of gas turbines and other devised subjected to abrading is designed to have one material function as a diffusion/sacrificial barrier as well as for structural restoration. The other material is to replace or repair the abradable area. This permits repair and accommodates shrouds and other components that become thinner after each repair cycle.

This method overcomes a known incompatibility of CoNiCrAlY wear coats with nickel single crystal base materials.

When the substrate material is formed of nickel, the first layer (diffusion barrier) includes a nickel alloy and/or a nickel-based, silicon or boron depressed braze alloy. In the latter, the primary melting point depressant of the braze alloy is silicon or boron. When both are used, For instance, a nickel alloy (approximately 30% to approximately 70%) and a nickel-based, silicon or boron depressed braze alloy (approximately 70% to approximately 30%) can be used. In such an embodiment, a compatible second (abradable seal) layer would include a cobalt-based MCrAlY alloy and/or a cobalt-based, silicon-depressed braze alloy. Other formulations may also be used.

Nickel-based, silicon-depressed braze alloys of the first layers could each contain less than approximately 1% boron. Notably, use of a boron-based braze material can potentially detrimentally affect the abradable layer by altering melt characteristics and environmental capabilities due to the migration of the boron from the structural layer to the abradable layer. For that reason, excess boron is to be avoided.

As shown in FIG. 1, a shroud or other nickel single crystal part 11 is coated with a first diffusion barrier layer 15, followed by a second, abradable layer 17. Dimension 19 indicates the original thickness of the shroud or other part as well as the restored dimension, thus allowing the part to be used in close tolerance applications such as with gas turbine blades.

As noted herein, the nickel single crystal part 11 to be repaired is cleaned and the abraded surfaces are prepared for repair as is normally done. Diffusion later 15 may then applied followed by applying abradable layer 17. Alternatively, diffusion layer 15 can be applied to abradable layer 17 using a perform 19, then removed from the perform 19 and applied to the nickel single crystal part 11. When perform 19 is used, the brazing process comprises subjecting the component and at least one perform 19 to temperatures ranging from approximately 2200° F. (1204.4° C.) to approximately 2325° F. (1273.9° C.) for approximately 20 minutes to approximately 10 hours. Preferably, the temperature ranges from between approximately 2250° F. (1232.2° C.) and approximately 2300° F. (1260° C.) for approximately 1.5 hours to approximately 10 hours.

Thicknesses of the layers can vary depending upon the application. By way of example, the first (diffusion barrier) layer 15 can vary between approximately 0.010 inches (0.254 mm) to about 0.020 inches (0.508 mm) thick while the second (abradable) layer 17 can vary between approximately 0.020" (0.508 mm) to approximately 0.150" (3.81 mm)

One example of a nickel alloy used as a first layer is shown below in Table I

TABLE I

|  | Min | max |
| --- | --- | --- |
| Carbon | 0.10 | 0.14 |
| Manganese |  | 0.10 |
| Silicon |  | 0.06 |
| Phosphorus |  | 0.01 |
| Sulfur |  | 0.004 |
| Chromium | 6.60 | 7.00 |
| Cobalt | 11.45 | 12.05 |
| Molybdenum | 1.30 | 1.70 |
| Tantalum | 6.00 | 6.60 |
| Tungsten | 4.70 | 5.10 |
| Columbium |  | 0.10 |
| Titanium |  | 0.02 |
| Aluminum | 5.94 | 6.30 |
| Boron | 0.01 | 0.02 |
| Hafnium | 1.30 | 1.70 |
| Iron |  | 0.20 |
| Copper |  | 0.10 |
| Zirconium |  | 0.030 |
| Magnesium |  | 0.0035 |
| Platinum |  | 0.30 |

TABLE I-continued

|  | Min | max |
|---|---|---|
| Rhenium | 2.60 | 3.00 |
| Selenium |  | 0.0050 |
| Vanadium |  | 0.10 |
| Yttrium |  | 0.20 |
| Total All Others |  | 0.50 |
| Nickel | remainder |  |

A nickel based alloy also used as a first layer alloy is shown in Table II, below

TABLE II

|  | min | max |
|---|---|---|
| Carbon |  | 0.050 (500 ppm) |
| Manganese |  | 0.12 |
| Silicon |  | 0.12 |
| Phosphorus |  | 0.015 |
| Sulfur |  | 0.015 |
| Chromium | 4.75 | 5.25 |
| Cobalt | 9.50 | 10.50 |
| Molybdenum | 1.70 | 2.10 |
| Tantalum | 7.80 | 9.00 |
| Tungsten | 5.60 | 6.20 |
| Rhenium | 2.80 | 3.20 |
| Aluminum | 5.50 | 5.80 |
| Hafnium | 0.25 | 0.45 |
| Yttrium | 0.003 | 0.040 |
| Boron |  | 0.010 |
| Iron |  | 0.20 |
| Copper |  | 0.10 |
| Zirconium |  | 0.03 |
| Lead |  | 0.0005 (5 ppm) |
| Bismuth |  | 0.00003 (0.3 ppm) |
| Selenium |  | 0.0003 (3 ppm) |
| Tellurium |  | 0.00005 (0.5 ppm) |
| Thallium |  | 0.00005 (0.5 ppm) |
| Nickel | remainder |  |

Another alloy that is useful as a second layer cobalt silicon-depressed braze alloy is shown in table III below, using 70% by weight of Component A and 30% by weight of Component B.

TABLE III

|  | Component A | | Component B | |
|---|---|---|---|---|
|  | min | max | | min | max |
| Nickel | 31 | 33 | Silicon | 14.5 | 15.5 |
| Yttrium | 0.10 | 0.65 | Iron |  | 0.15 |
| Phosphorus | 0.01 |  | Sulfur |  | 0.005 |
| Nitrogen |  | 0.01 | Oxygen |  | 0.02 |
| Chromium | 20 | 22 | Aluminum | 9 | 11 |
| Iron |  | 0.15 | Carbon |  | 0.02 |
| Sulfur |  | 0.01 | Selenium |  | 0.005 |
| Oxygen |  | 0.05 | Phosphorus |  | 0.01 |
| Aluminum | 7 | 9 | Nitrogen |  | 0.01 |
| Carbon |  | 0.02 | Cobalt | remainder | |
| Selenium |  | 0.005 | | | |
| Cobalt | remainder | | | | |

An abradable alloy suitable for the present invention is shown in Table IV below.

TABLE IV

|  | min | max |
|---|---|---|
| Cobalt | 9.0 | 10.0 |
| Chromium | 13.0 | 14.0 |

TABLE IV-continued

|  | min | max |
|---|---|---|
| Aluminum | 3.8 | 4.2 |
| Silicon |  | 0.2 |
| Boron | 2.35 | 2.65 |
| Iron |  | 0.2 |
| Carbon |  | 0.06 |
| Titanium |  | 0.05 |
| Zirconium |  | 0.05 |
| Manganese |  | 0.04 |
| Phosphorus |  | 0.02 |
| Sulfur |  | 0.02 |
| Selenium |  | 0.005 |
| Nickel | remainder |  |

The method of this invention has been tested on turbine shrouds and other components subjected to abrading to extend the life of the shrouds for a substantial number of repairs. These tests substantiated the ability of the method to provide for more frequent replenishment of the abradable layer and minimizing the damage to the underlying shroud. It is particularly effective because the present invention permits the use of cobalt-based superalloys that operate at higher temperatures than nickel-based superalloys due to the intervening diffusion layer that prevents incompatibility of the abradable coating layer with the underlying part or component being repaired.

Although the present invention has been described with reference to preferred embodiments, workers skilled in the art will recognize that changes may be made in form and detail without departing from the spirit and scope of the invention.

The invention claimed is:

1. A method of repairing an abradable, nickel single crystal material having an abraded surface area, comprising;
   applying a diffusion layer selected from a nickel alloy and a nickel-based alloy having at least one of silicon and boron therein of about 0.010 inches (0.254 mm) to about 0.020 inches (0.508 mm) thick to the abraded surface area comprising a nickel-based alloy having a quantity of an additional element selected from silicon and boron; and
   applying an abradable layer of about 0.020 inches (0.508 mm) to about 0.150 inches (3.81 mm) thick to the material comprising a cobalt-based alloy to restore the abraded surface area.

2. The method of claim 1, wherein the diffusion layer is a combination of a nickel alloy and a nickel-based alloy having at least one of silicon and boron therein.

3. The method of claim 2, wherein the amount of the nickel alloy by weight ranges from about 30% to about 70% and the amount of the nickel-based alloy by weight ranges from about 70% to 30%.

4. The method of claim 1, wherein the abradable layer is a silicon-depressed cobalt-based MCrAlY braze alloy.

5. A method of repairing an abradable, nickel single crystal material having an abraded surface area, comprising;
   applying a diffusion layer selected from a combination of a nickel alloy and a nickel-based alloy having at least one of silicon and boron therein of about 0.010 inches (0.254 mm) to about 0.020 inches (0.508 mm) thick to the abraded surface area comprising a nickel-based alloy having a quantity of an additional element selected from silicon and boron, wherein the amount of the nickel alloy by weight ranges from about 30% to about 70% and the amount of the nickel-based alloy by weight ranges from about 70% to 30%; and applying is a silicon-depressed cobalt-based MCrAlY braze alloy as an abradable layer of about 0.020 inches (0.508 mm) to about 0.150 inches (3.81 mm) thick to the material comprising a cobalt-based alloy to restore the abraded surface area.

* * * * *